(12) United States Patent
Wang et al.

(10) Patent No.: US 8,182,130 B2
(45) Date of Patent: May 22, 2012

(54) LIGHT GUIDING STRUCTURE OF A LIGHT GUIDE PLATE

(75) Inventors: Chiung-Han Wang, Hsinchu (TW); Jing-Huan Liao, Hsinchu (TW); Yu-Tsung Huang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 13/327,337

(22) Filed: Dec. 15, 2011

(65) Prior Publication Data

US 2012/0087152 A1    Apr. 12, 2012

Related U.S. Application Data

(62) Division of application No. 12/470,650, filed on May 22, 2009.

(30) Foreign Application Priority Data

Feb. 6, 2009   (TW) ................. 98103832 A

(51) Int. Cl.
*F21V 7/04* (2006.01)
(52) U.S. Cl. .......... 362/620; 362/619; 362/330; 349/62; 359/599; 359/831
(58) Field of Classification Search ............. 362/311.06, 362/330, 339, 619, 620; 349/62; 359/599, 359/831
See application file for complete search history.

(56) References Cited

U.S. PATENT DOCUMENTS

| | | | |
|---|---|---|---|
| 5,779,337 A | 7/1998 | Saito et al. | |
| 2010/0202147 A1* | 8/2010 | Wang et al. ............ | 362/355 |

FOREIGN PATENT DOCUMENTS

| | | |
|---|---|---|
| CN | 1818760 | 8/2006 |
| JP | 2003-140126 | 5/2003 |
| TW | 00529552 | 4/2003 |
| TW | M289860 | 4/2006 |
| TW | M309123 | 4/2007 |

OTHER PUBLICATIONS

English translation of abstract of TW 00529552, published Apr. 21, 2003.
English translation of abstract of TW M289860, published Apr. 21, 2006.
English translation of abstract of TW M309123, published Apr. 1, 2007.
Chinese language office action dated Jan. 22, 2010.
English language translation of abstract and pertinent parts of CN 1818760, published Aug. 16, 2006.
English language translation of abstract and pertinent parts of JP 2003-140126, published May 14, 2003.

* cited by examiner

*Primary Examiner* — Stephen F Husar
(74) *Attorney, Agent, or Firm* — Thomas, Kayden, Horstemeyer & Risley, LLP

(57) ABSTRACT

A light guiding structure of a light guide plate is provided. The light guiding structure comprises a plurality of protrusion ridge portions extending along a longitudinal direction. The height or the vertex angle of each protrusion ridge portion periodically or randomly varies along the longitudinal direction.

15 Claims, 4 Drawing Sheets

1

LIGHT GUIDING STRUCTURE OF A LIGHT GUIDE PLATE

This application is a divisional application of U.S. application Ser. No. 12/470,650 filed May 22, 2009, which claims priority to Taiwan Patent Application No. 098103832 filed on Feb. 6, 2009, the disclosures of which are incorporated herein by reference in their entirety.

BACKGROUND OF THE INVENTION

1. Field of the Invention

The present invention provides a light guiding structure of a light guide plate. In particular, the present invention provides a light guiding structure that shields defects.

2. Descriptions of the Related Art

Because of advantages such as low power consumption, light weight, low emission and good portability, liquid crystal displays (LCDs) have been widely applied to TV sets, computer screens, notebook computers, vehicle navigation systems, mobile communication devices and the like. Accordingly, LCDs have gradually replaced conventional displays and have become the mainstream product in the display market. One of the critical components in an LCD is the backlight module, which is responsible for supplying uniform and sufficient light for the LCD panel.

Depending on the location where the light sources are disposed, backlight modules primarily comprise two categories: the direct-light type and the edge type. In the backlight module of the edge type, the light source is disposed on one edge of the light guiding plate. The most prominent advantage of the edge type is that the backlight module as a whole can be made to be light and thin, while the requirements of high luminance, low cost and uniform brightness are still satisfied. Accordingly, the backlight modules of the edge type have drawn a lot of attention in applications of specific LCDs sizes. In addition, the light guide plate of the edge type backlight modules may be a flat plate or wedge plate, in which a single side can be provide with a light source or the light sources may be provided on both sides of the light guide plate to enhance the overall luminance.

However, local bright spots or dark spots resulting in non-uniformity are likely to occur in the surface light source projected by the emergent surface of the light guide plate. For example, local bright spots may be caused by some missing structures during the production process of the light guide plate, and local dark spots may be caused by scratching during the transport process. A conventional solution is to additionally provide a lower diffusion sheet to mitigate the effect of bright spots or dark spots. Unfortunately, the disposition of the lower diffusion sheet tends to cause degradation of the overall luminance. On the other hand, without the lower diffusion sheet, the defects of bright spots or dark spots cannot be mitigated, and this is undesirable for the overall uniformity of the surface light source.

In view of this, it is highly desirable in the art to provide a light guiding structure of a light guide plate which eliminates the need of an additional lower diffusion sheet while eliminating the problem of bright or dark spots and scratching.

SUMMARY OF THE INVENTION

One objective of this invention is to provide a light guiding structure of a light guide plate, which is adapted to shield defects such as bright or dark spots on the light guide plate by disordering light paths through the structural variations of the light guiding structure.

This invention discloses a light guiding structure of a light guide plate. The light guiding structure comprises a plurality of protrusion ridge portions extending along a longitudinal direction. Each of the protrusion ridge portions has a height having a height variation and an average height corresponding thereto along the longitudinal direction. The height variation is between 2% and 15% of the average height. In another embodiment of this invention, each of the protrusion ridge portions has a vertex angle having an angle variation and an average angle corresponding thereto along the longitudinal direction, wherein the angle variation is between ±10% of the average angle.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, this invention will be explained with reference to embodiments thereof. However, these embodiments are not intended to limit this invention to any specific environment, applications or particular implementations described in these embodiments. Therefore, descriptions of these embodiments are only for purposes of illustration rather than limitation. It should be appreciated that in the following embodiments and the attached drawings, dimensions of the elements are only depicted to clearly disclose the subject matter of this invention but not to limit this invention, and elements unrelated to this invention are omitted from depiction.

Figure 1:
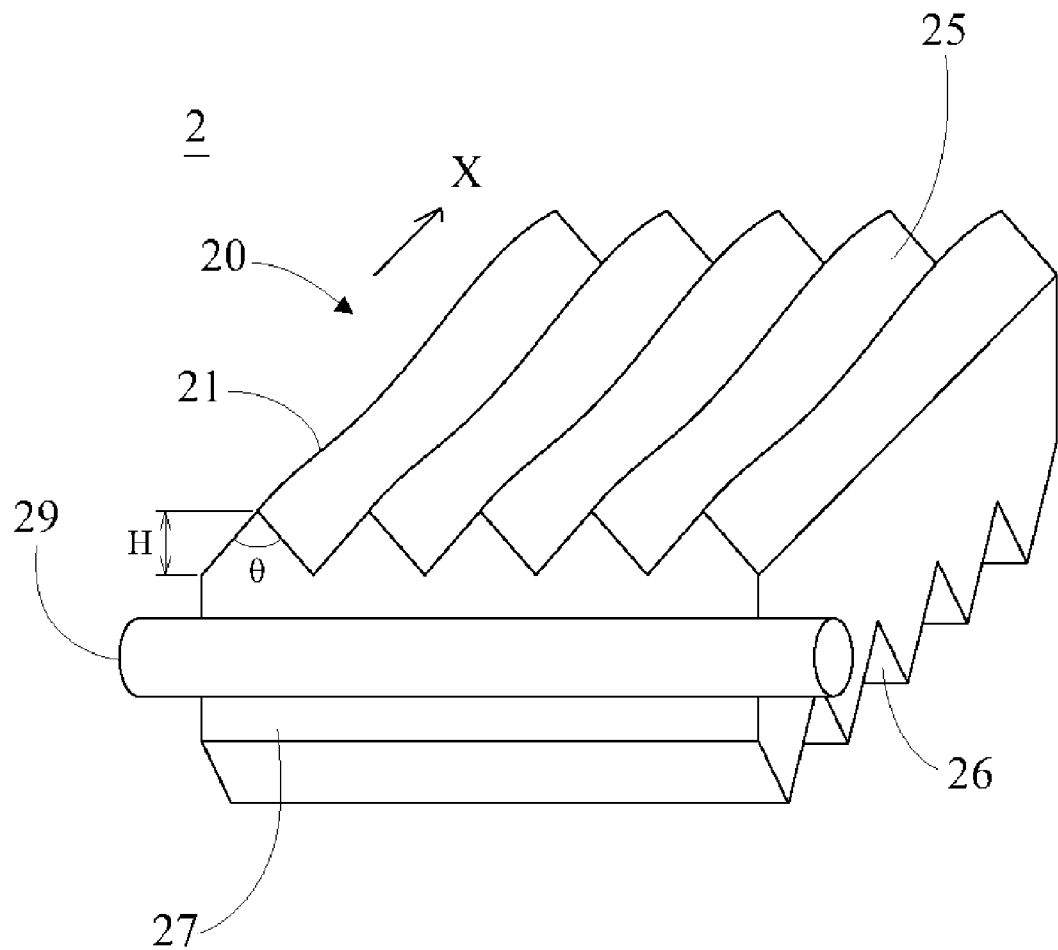
FIG. 1 is a schematic view of a light guiding structure according to the first embodiment of this invention.

FIG. 1 depicts a light guide plate 2 according to a first embodiment of this invention. The light guide plate 2 comprises an emergent surface 25, a bottom surface 26 opposite the emergent surface 25 and an incident surface 27 located on the side edge thereof. The incident surface 27 is adapted to receive incident light from a light source 29. In this embodiment, the emergent surface 25 of the light guide plate 2 is formed by a light guiding structure 20. The light guiding structure 20 comprises a plurality of protrusion ridge portions 21, each of which substantially extends along a longitudinal direction X perpendicular to the incident surface 27, and the protrusion ridge portions 21 define the emergent surface 25.

The feature of the light guiding structure 20 is that each of the protrusion ridge portions 21 varies along the longitudinal direction X. In this embodiment, each of the protrusion ridge portions 21 has a substantially triangular cross section and a height H. Each of the heights H of the protrusion ridge portions 21 exhibits a height variation along the longitudinal direction X.

More specifically, as the height H of each protrusion ridge portion 21 varies along the longitudinal direction X, an average height may be defined for each of the protrusion ridge portions 21. Preferably, the variation of the height H ranges between 2% and 15% of the average height. Additionally, if the height H varies periodically, the variation period of the height H preferably ranges between 40 times and 70 times of the height variation.

In this embodiment, each of the protrusion ridge portions 21 with a triangular cross section may have a vertex angle θ, which preferably ranges between 60 degrees and 170 degrees, and even better, between 70 degrees and 110 degrees. The protrusion ridge portions 21 may have identical or different vertex angles θ (e.g., randomly or regularly varying angles). The vertex angles θ of the protrusion ridge portions 21 depicted in FIG. 1 are substantially identical to each other, but this is only for purposes of illustration rather than limitation. Additionally, the protrusion ridge portions 21 depicted in FIG. 1 are adjacent to each other and continuously distributed on the light guide plate 2.

Although the protrusion ridge portions 21 disclosed in this embodiment are disposed on the emergent surface 25, the protrusion ridge portions 21 may also be disposed on the bottom surface 26. In other embodiment, the emergent surface 25 is formed with the protrusion ridge portions 21, while the bottom surface 26 may be formed with a sandblasting structure (not shown) or a conventional V-shaped groove. Alternatively, the bottom surface 26 may be formed with the protrusion ridge portions 21, while the emergent surface 25 may be formed with the sandblasting structure (not shown) or the conventional V-shaped groove instead.

It should be noted that the light guide plate in this invention is not limited to a flat plate or a wedge plate. The height variation of the protrusion ridge portions 21 may also be either periodic or random. However, if the protrusion ridge portions 21 have a short height variation period, it can easily gain a better result of disordering light rays and thereby get a better effect of shielding bright or dark spots.

Figure 2:
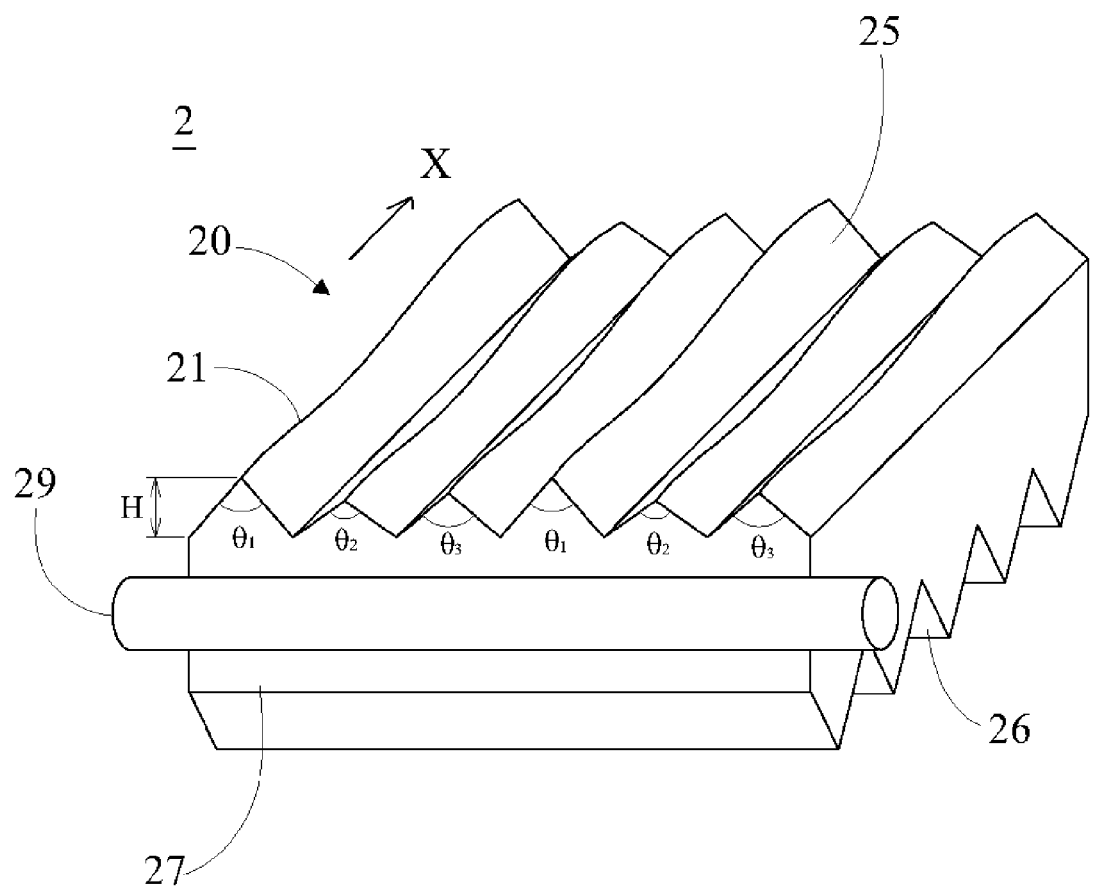
FIG. 2 is a schematic view of a light guiding structure according to the second embodiment of this invention.

A second embodiment of this invention is depicted in FIG. 2. On basis of the first embodiment, the vertex angles θ vary among the protrusion ridge portions 21, and the protrusion ridge portions 21 are periodically distributed on the light guide plate 2 according to the vertex angles θ (i.e. $\theta_1, \theta_2, \theta_3$). As shown in FIG. 2, the vertex angles θ vary cyclically in the order of a first angle $\theta_1$, a second angle $\theta_2$ and a third angle $\theta_3$. For example, the first angle $\theta_1$ is 80 degrees, the second angle $\theta_2$ is 120 degrees and the third angle $\theta_3$ is 150 degrees; or as another example, the first angle $\theta_1$ is 120 degrees, the second angle $\theta_2$ is 150 degrees and the third angle $\theta_3$ is 160 degrees. It should be noted that the angle variations and the number of angles in the variation cycle described above are only provided for illustration but not for limitation, and can be devised depending on the demands of the product.

Figure 3:
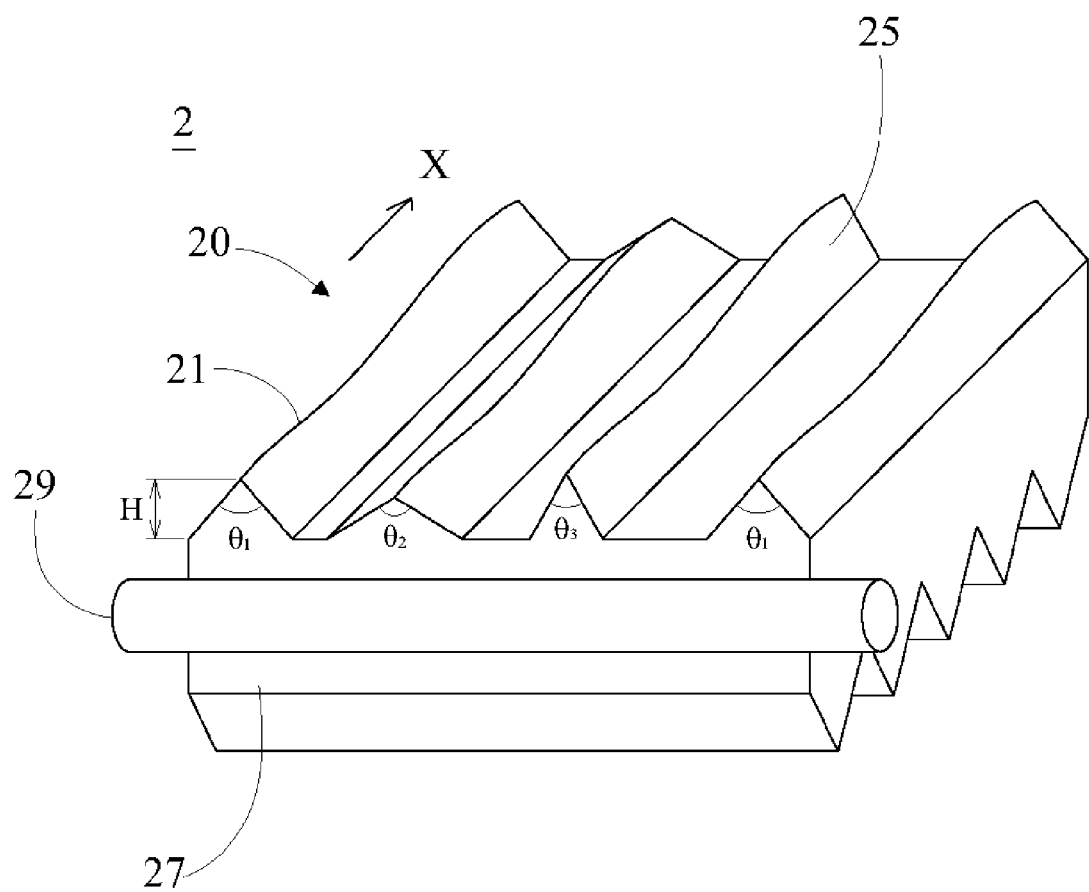
FIG. 3 is a schematic view of a light guiding structure according to the third embodiment of this invention.

A third embodiment of this invention is shown in FIG. 3. As shown, the protrusion ridge portions 21 are distributed on the light guide plate 2 and spaced apart from each other. Additionally, both the variation range and whether the vertex angles θ (i.e. $\theta_1, \theta_2, \theta_3$) vary or not are just similar to what is described in the above embodiments and will not be described again herein.

Figure 4:
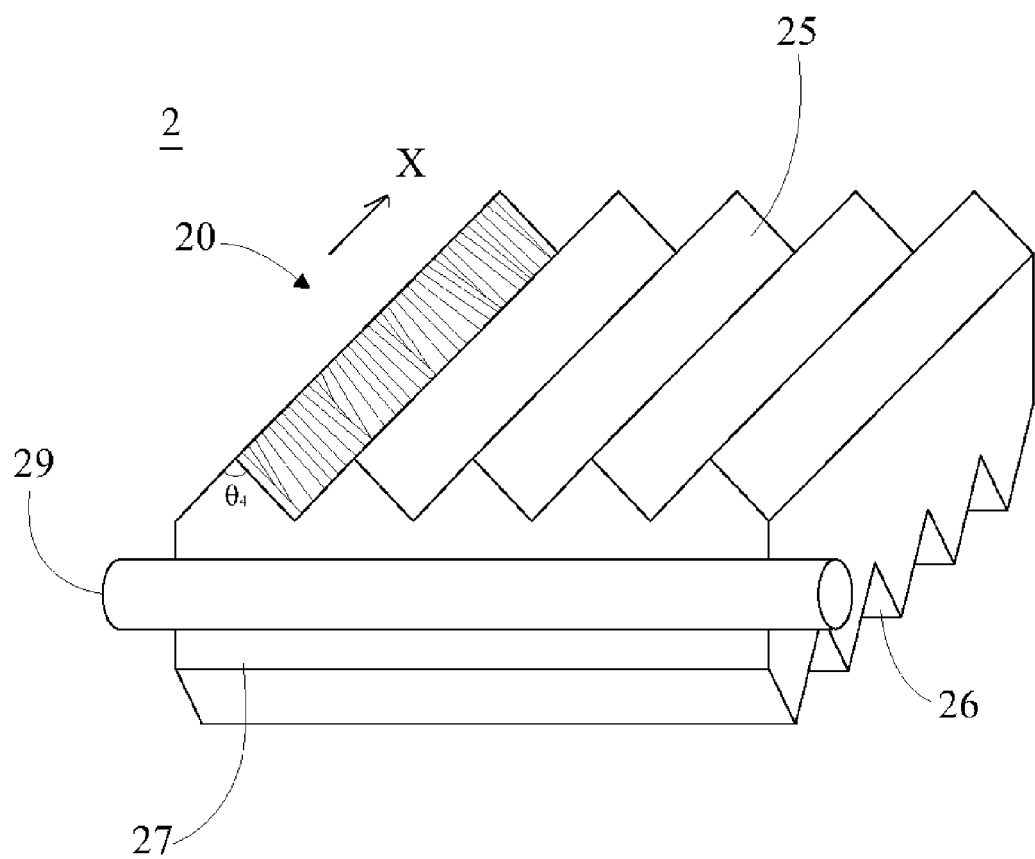
FIG. 4 is a schematic view of a light guiding structure according to the fourth embodiment of this invention.

A fourth embodiment of this invention is shown in FIG. 4. Unlike the above embodiments, the vertex angle $\theta_4$ of the protrusion ridge portions 21 in this embodiment exhibits an angle variation along the longitudinal direction X. In more detail, as the vertex angle varies, an average angle may be defined for the vertex angle $\theta_4$ of each of the protrusion ridge portions 21. Preferably, the angle variation of the vertex angle $\theta_4$ ranges between ±10% of the average angle. The angle variation may be periodic or random. If the angle variation is periodic, the period preferably ranges between 10 times and 50 times of the angle variation.

It should be noted that the protrusion ridge portions 21 may be distributed continuously or spaced apart discontinuously. The vertex angles $\theta_4$ can not only vary periodically or randomly along the longitudinal direction X, they can further be identical to or different from each other (e.g., distributed randomly or periodically). This has already been disclosed in the above embodiments and will not be described again herein.

According to the above descriptions, the light guiding structure of this invention has a height or vertex angle thereof varied periodically along the longitudinal direction and has protrusion ridge portions arranged in various ways, so that the light paths are interfered to result a visually disordering effect. Thereby, the defects of bright spots, dark spots or scratches can be shielded and the product yield can be improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light guiding structure of a light guide plate, comprising:
   a plurality of protrusion ridge portions extending along a longitudinal direction, in which each of the protrusion ridge portions has a vertex angle having an angle variation and an average angle corresponding thereto along the longitudinal direction;
   wherein the angle variation is between ±10% of the average angle.

2. The light guiding structure of claim 1, wherein the light guide plate has an incident surface substantially perpendicular to the longitudinal direction.

3. The light guiding structure of claim 2, wherein the angle variation is a periodical variation.

4. The light guiding structure of claim 3, wherein the angle variation varies with a period between 10 times and 50 times of the angle variation.

5. The light guiding structure of claim 2, wherein the angle variation is a random variation.

6. The light guiding structure of claim 4, wherein each of the protrusion ridge portions has a cross-section which is substantially a triangle.

7. The light guiding structure of claim 6, wherein the protrusion ridge portions are periodically distributed on the light guide plate according to the vertex angles.

8. The light guiding structure of claim 7, wherein the vertex angles are between 60 degrees and 170 degrees.

9. The light guiding structure of claim 8, wherein the vertex angles are between 70 degrees and 110 degrees.

10. The light guiding structure of claim 7, wherein the protrusion ridge portions are mutually adjacent and continuously distributed on the light guide plate.

11. The light guiding structure of claim 2, wherein the light guide plate has an emergent surface substantially defined by the protrusion ridge portions.

12. The light guiding structure of claim 11, wherein the light guide plate further comprises a bottom surface opposite to the emergent surface, and a sandblasting structure is formed on the bottom surface.

13. The light guiding structure of claim 2, wherein the light guide plate comprises an emergent surface and a bottom surface opposite to the emergent surface, and the bottom surface is substantially defined by the protrusion ridge portions.

14. The light guiding structure of claim 13, wherein a sandblasting structure is formed on the emergent surface.

15. The light guiding structure of claim 2, wherein the light guide plate is one of a flat plate and a wedge plate.

* * * * *